United States Patent
Yamazaki

(10) Patent No.: US 8,390,834 B2
(45) Date of Patent: Mar. 5, 2013

(54) IMAGE PROCESSING APPARATUS

(75) Inventor: Masataka Yamazaki, Kuwana (JP)

(73) Assignee: Brother Kogyo Kabushiki Kaisha, Aichi-Ken, Nagoya-Shi (JP)

( * ) Notice: Subject to any disclaimer, the term of this patent is extended or adjusted under 35 U.S.C. 154(b) by 152 days.

(21) Appl. No.: 13/075,835

(22) Filed: Mar. 30, 2011

(65) Prior Publication Data

US 2012/0081728 A1  Apr. 5, 2012

(30) Foreign Application Priority Data

Sep. 30, 2010 (JP) ................................. 2010-220563

(51) Int. Cl.
*G06F 3/12* (2006.01)
(52) U.S. Cl. ...................................... 358/1.13
(58) Field of Classification Search .................. 358/1.13
See application file for complete search history.

(56) References Cited

U.S. PATENT DOCUMENTS

| | | | | |
|---|---|---|---|---|
| 5,070,404 | A | * | 12/1991 | Bullock et al. ............... 348/460 |
| 5,963,340 | A | * | 10/1999 | Kim ............................ 358/440 |
| 6,239,881 | B1 | * | 5/2001 | Shaffer et al. ................ 358/440 |
| 6,594,351 | B1 | * | 7/2003 | Bhogal et al. ............ 379/100.01 |
| 6,704,119 | B1 | * | 3/2004 | Suzuki et al. ................ 358/1.16 |
| 2002/0018657 | A1 | * | 2/2002 | Serizawa ........................ 399/27 |
| 2002/0176108 | A1 | * | 11/2002 | Jeon ............................. 358/1.15 |

FOREIGN PATENT DOCUMENTS

| | | |
|---|---|---|
| JP | 10-013594 | 1/1998 |
| JP | 11-341242 | 12/1999 |
| JP | 2002-064670 | 2/2002 |
| JP | 4204739 | 10/2008 |

OTHER PUBLICATIONS

Japanese Official Action dated Aug. 21, 2012 together with an English language translation from related application JP 2010-220563.

* cited by examiner

*Primary Examiner* — King Poon
*Assistant Examiner* — Andrew H Lam
(74) *Attorney, Agent, or Firm* — Scully, Scott, Murphy & Presser, P.C.

(57) ABSTRACT

A control section attaches a reprinting data mark to FAX image data received in a "Replace Toner" state and then stores the data. Then, a user is prompted to check whether an image of the FAX image data with the reprinting data mark printed most recently has been outputted appropriately. In case of appropriate output, all the FAX image data pieces with the reprinting data marks stored in a storage section are deleted. In contrast, in case of inappropriate output, the FAX image data is stored intact as reprinting data.

10 Claims, 6 Drawing Sheets

IMAGE PROCESSING APPARATUS

CROSS-REFERENCE TO RELATED APPLICATIONS

This non-provisional application claims priority under 35 U.S.C. §119(a) on Patent Application No. 2010-220563 filed in Japan on Sep. 30, 2010, the entire contents of which are hereby incorporated by reference.

TECHNICAL FIELD

The present invention relates to an image processing apparatus.

BACKGROUND

Traditionally, in the field of multi function peripherals having a FAX function, there is a technique disclosed in Japanese Patent No. 4204739. In a multi function peripheral according to Japanese Patent No. 4204739, when an abnormity is detected in the toner density by a toner density sensor detecting the toner density in a developing unit, received FAX image data is stored into a storage section. Then, the stored FAX image data is outputted by an image forming section, and then a message requesting a check whether the output has been normal is displayed on a display section. Then, when a user inputs confirmation of normal output through an operation section, the multi function peripheral deletes the FAX image data stored in the storage section because the data is no longer necessary. In contrast, in case of abnormal output, the FAX image data is held in the storage section.

SUMMARY

Nevertheless, FAX receiving may occur even in a state that the multi function peripheral is left for a long time like in the midnight and in a long leave. Thus, when a user is to receive printed FAX documents, a large amount of FAX image data has been printed in some cases. In this case, in the conventional multi function peripheral having the FAX function, when the user checks the image quality of each printed FAX image and then inputs each result of output normality check, heavy operation burden is caused on the user.

The present invention has been devised in view of the above-mentioned situation. An object of this is to provide an image processing apparatus in which operation burden on users is reduced that occurs at the time of check of the image quality of printed FAX image data.

The image processing apparatus according to a first aspect of the present invention devised for resolving the above-mentioned problem is an image processing apparatus processing image data containing FAX image data, comprising: receiving means for receiving image data; storage means for storing the received image data; printing means for printing an image onto a medium, based on the FAX image data stored in the storage means; accepting means for accepting information concerning a check result of image quality of the image printed by the printing means; and controlling means for, when the accepting means accepts information that the image quality of the image is appropriate, deleting the FAX image data printed by the printing means among the FAX image data stored in the storage means.

According to this configuration, when the accepting means accepts information that the image quality of the printed image of FAX image data is appropriate, the controlling means deletes the printed FAX image data among the stored FAX image data. By virtue of this, when a user merely inputs an image quality check result of one time, the stored FAX image data can be deleted. This reduces operation burden on users.

According to the image processing apparatus of the present invention, operation burden on users is reduced that occurs at the time of check of the image quality of printed images of FAX image data.

The above and further objects and features will more fully be apparent from the following detailed description with accompanying drawings.

Figure 1:
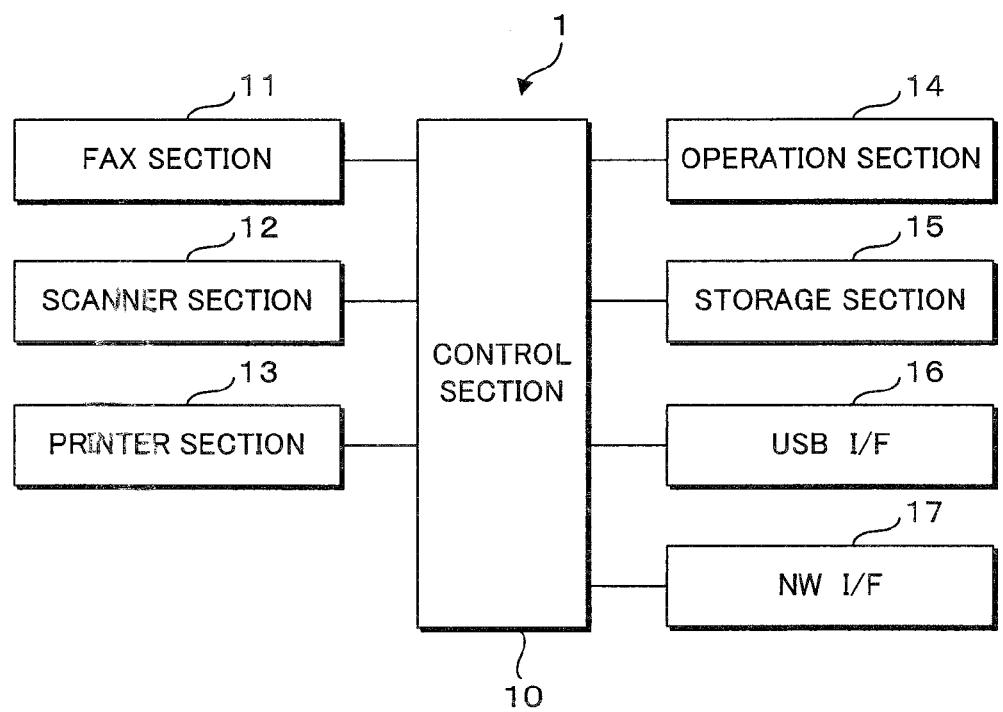
FIG. 1 is a block diagram illustrating an electrical configuration of a multi function peripheral according to an embodiment.

DETAILED DESCRIPTION (Embodiment 1)
Embodiment 1 of the present invention is described below with reference to FIGS. 1 to 4.
<Configuration of Multi Function Peripheral>
FIG. 1 is a block diagram illustrating the electrical configuration of a multi function peripheral 1 according to Embodiment 1. The multi function peripheral 1 includes a control section 10, a facsimile (FAX) section 11, a scanner section 12, a printer section 13, an operation section 14, a storage section 15, a USB interface (USB I/F) 16, and a network interface (NW I/F) 17.

The control section 10 includes a CPU, a ROM, and a RAM. The CPU executes various kinds of programs stored in the ROM so as to control the individual sections of the multi function peripheral 1. The ROM stores various kinds of programs, data, and the like used in the execution of the CPU. The RAM is used as a main storage device when the CPU executes various kinds of processing.

The FAX section 11 (a receiving section) includes an NCU (Network Control Unit), a modem, and an ASIC controlling these, and performs FAX transmission and reception of image data to and from an external FAX machine through a public switched telephone network.

The scanner section 12 includes: a light source illuminating a document; a linear image sensor; an optical system forming onto the linear image sensor an optical image of the document illuminated by the light source; and a conveyance mechanism performing relative displacement of the document and the linear image sensor. Then, the scanner section 12 reads the document so as to generate image data.

The printer section 13 prints an image expressed by the image data, onto a recording medium such as paper by electrophotography.

In the printer section 13, a toner cartridge accommodating black toner is provided in a detachable manner. Then, the printer section 13 prints an image (referred to as "prints image data", hereinafter) onto a recording medium by using the toner accommodated in the toner cartridge. Here, color of the toner employed in the present embodiment is black. However, the color of employable toner is not limited to black.

The operation section 14 (an accepting section) includes: a display device such as an LCD (Liquid Crystal Display); an approximately transparent touch panel covering a display surface of the display device; and various kinds of operation buttons. When a user operates the operation section 14, a function of the multi function peripheral 1 is selected or alternatively various kinds of setting are performed.

The storage section 15 is a device storing various kinds of data by means of a nonvolatile memory such as a hard disk and a flash memory. Here, for example, an external file server may be employed as the storage section 15.

The USB (Universal Serial Bus) interface 16 includes a USB host controller and a USB port, and is connected to a USB mass storage device such as a USB memory and a USB hard disk.

The network interface 17 (a receiving section) is connected to an external computer through a communication network such as an LAN and the Internet in a manner realizing communication.

<Functions of Multi Function Peripheral>

The multi function peripheral 1 is configured so as to execute a FAX receiving function, a print function, a direct print function, and a copy function.

The FAX receiving function is a function of performing FAX receiving of image data from an external FAX machine through the FAX section 11 and then printing the FAX image data (referred to as "FAX image data", hereinafter) through the printer section 13.

The print function is a function of receiving image data from an external computer through the network interface 17 and then printing the received image data through the printer section 13.

The direct print function is a function of reading image data from the USB mass storage device connected through the USB interface 16 and then printing the read image data by the printer section 13.

The copy function is a function of reading a document by the scanner section 12 so as to generate image data and then printing the generated image data by the printer section 13.

In each function described above, the image data (such as the FAX image data and the image data received from an external computer) is stored temporarily into the RAM, and then deleted from the RAM after the printing.

<Degree of Consumption of Toner Cartridge>

The toner cartridge includes a toner accommodation chamber, an agitator, a supply roller, a developing roller, and a layer thickness control blade (not illustrated).

The toner accommodation chamber accommodates nonmagnetic toner having positive electrostatic charging property.

The toner is used at each time that printing is performed by the printer section 13. Then, when the toner has been consumed in an amount exceeding a certain amount, the amount of toner becomes insufficient so that the printing becomes faint, that is, the printing image quality becomes degraded.

Further, the developing roller also wears out gradually when its revolution is repeated. Thus, when the number of revolutions exceeds a certain number of revolutions, the amount of toner capable of being carried is reduced so that the printing becomes faint, that is, the printing image quality becomes degraded.

Thus, the control section 10 judges the degree of consumption of the toner cartridge based on the amount of used toner and the number of revolutions of the developing roller measured since the toner cartridge has been changed to a new one.

The present embodiment is described for an example that the amount of used toner and the number of revolutions of the developing roller are judged based on the number of printed sheets counted since the toner cartridge has been changed to a new one.

The number of printed sheets corresponding to the amount of used toner causing the printing to become faint and the number of printed sheets corresponding to the number of revolutions causing the printing to become faint are obtained in advance by experiment. Then, in the multi function peripheral 1, the smaller one of the numbers of printed sheets is set up as a first number of sheets. The first number of sheets may be changed in association with the size, the contents, or the like of image data to be printed. In the present embodiment, the first number of sheets is set up within the range between 1200 and 1700.

Further, the number of printed sheets corresponding to the amount of used toner that reaches a usage limit (the remained toner amount is 0) and the number of printed sheets corresponding to a situation that the developing roller reaches a usage limit (the number of revolutions causing a situation that the printing becomes faint to an extent that the contents are difficult to be recognized) are also obtained in advance by experiment. Then, in the multi function peripheral 1, the smaller one of the numbers of printed sheets is set up as a second number of sheets. The second number of sheets also may be changed in association with the size, the contents, or the like of image data to be printed. In the present embodiment, the second number of sheets is set to be 4000.

The control section 10 counts the number of printed sheets and, when the number of printed sheets is smaller than the first number of sheets, judges that the degree of consumption of the toner cartridge is in a "Ready" state. When the number of printed sheets is greater than or equal to the first number of sheets and smaller than the second number of sheets, the control section 10 judges that the degree of consumption is a "Replace Toner" state. These states are described below in detail.

<State Transitions of Control Section>

Figure 2:
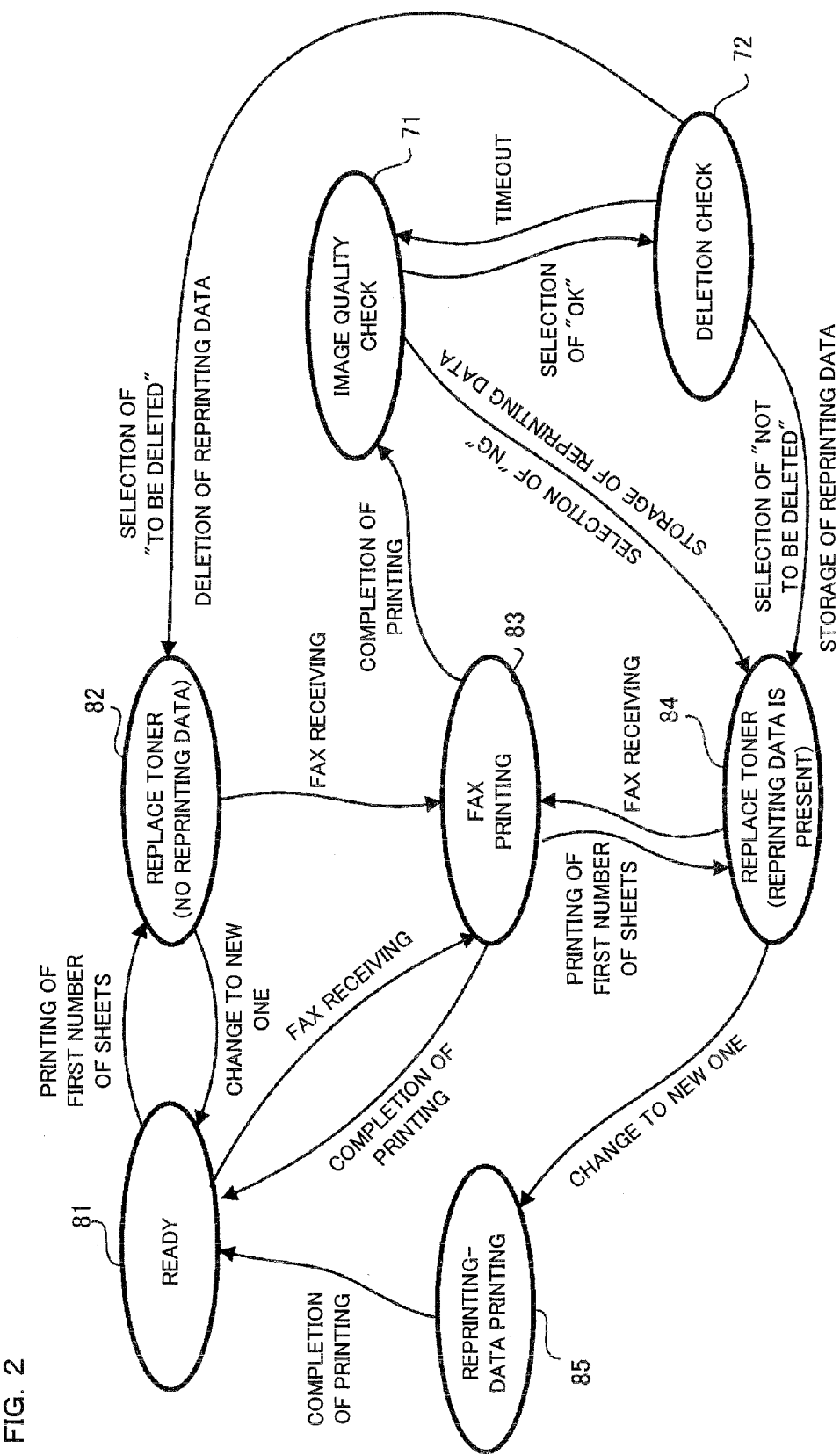
FIG. 2 is a state transition diagram illustrating state transition of a control section.

FIG. 2 is a state transition diagram illustrating state transitions of the control section 10. Here, the state of the degree of consumption of the toner cartridge also is illustrated. Here, FIG. 2 illustrates state transitions of the control section 10 in a simplified manner. That is, the state of the control section 10 may transit to another state through a transition path different from those illustrated in FIG. 2.

The "Ready" state 81 is a state that after the toner cartridge is changed to a new one, the number of printed sheets does not yet reach the first number of sheets.

When the toner cartridge is changed to a new one, the control section 10 initializes into 0 the counter variable n used for counting the number of printed sheets, and then adds 1 to the counter variable n at each time that an image is printed onto a sheet of recording medium. This counting is performed when printing is performed by whatever function selected from the FAX receiving function, the print function, the direct print function, and the copy function. When the value of the counter variable n is smaller than the first number of sheets, the control section 10 judges that the state is in the "Ready" state 81.

When image data is received in the "Ready" state 81, the control section 10 causes the printer section 13 to print the image data.

When printing is repeated in the "Ready" state 81 and then the value of the counter variable n reaches the first number of sheets, the state of the control section 10 transits to the "Replace Toner (No Reprinting Data)" state 82.

The "Replace Toner (No Reprinting Data)" state 82 is a state that the number of printed sheets counted since the toner cartridge has been changed to a new one falls within the range greater than or equal to the first number of sheets and smaller than the second number of sheets.

When the state transits to the "Replace Toner (No Reprinting Data)" state 82, the control section 10 first displays onto the operation section 14 a mode selection screen (not illustrated) used for selecting a "Stop" mode or a "Continue" mode. Then, the user selects one of these modes.

When the user selects a "Stop" mode, the control section 10 displays onto the operation section 14 a message requiring the replacement of the toner cartridge. Then, receiving of image data is completely rejected until the toner cartridge is changed. Alternatively, image data may be stored into the storage section 15 without being printed.

In contrast, when the user selects a "Continue" mode, the control section 10 transits to the "Replace Toner (No Reprinting Data)" state 82. Then, when image data is received after that, the image data is printed by the printer section 13. Here, when the received image data is print image data, direct print image data, or scanned image data, the control section 10 causes the printer section 13 to execute printing and then transits to the "Replace Toner (No Reprinting Data)" state 82.

Further, when FAX receiving is performed in the "Replace Toner (No Reprinting Data)" state 82, the state of the control section 10 transits to the "FAX Printing" state 83.

In whichever case that a "Stop" mode or a "Continue" mode is selected, when the toner cartridge is changed to new one in the "Replace Toner (No Reprinting Data)" state 82, the state of the control section 10 returns to the "Ready" state 81. Further, when printing is repeated in the "Replace Toner (No Reprinting Data)" state 82 so that the counter variable n reaches the second number of sheets, a message requiring the replacement of the toner cartridge is displayed. Then, when the toner cartridge has been changed, the state returns to the "Ready" state 81.

The "FAX Printing" state 83 is a state that FAX image data is under printing.

On completion of printing of FAX image data, the control section 10 transits to the "Image Quality Check" state 71 in which an image quality check screen is displayed on the operation section 14. Then, the user selects the presence or absence of any problem in the printing image quality of the printed image data. As described later in detail, in the "Image Quality Check Processing", in the "Image Quality Check" state 71, when FAX image data is received before the image quality is checked by the user, the control section 10 updates the image quality check screen such as to request the check of the image quality of the image of the received FAX image data, and then transits to the "Image Quality Check" state 71 again.

In the "Image Quality Check" state 71, when the user recognizes a problem in the printing image quality like in a situation that the printing is faint and hence hard to be read, the user selects "NG" in the image quality check screen. In contrast, in case of the absence of a problem in the printing image quality, the user selects "OK".

When the user selects "NG", the control section 10 stores into the storage section 15 the FAX image data as reprinting data. After the reprinting data is stored into the storage section 15, the state of the control section 10 transits to the "Replace Toner (Reprinting Data Is Present)" state 84.

In contrast, when the user selects "OK", the control section 10 transits to the "Deletion Check" state 72 in which a deletion check screen is displayed on the operation section 14. Then, the user specifies whether the printed FAX image data is to be deleted. When the FAX image data is to be deleted from the multi function peripheral 1, the user selects "To Be Deleted". When the FAX image data is desired to be held in the multi function peripheral 1, the user selects "Not to Be Deleted".

When the user selects "To Be Deleted", the control section 10 deletes all reprinting data pieces stored in the storage section 15. After all reprinting data pieces have been deleted, the state of the control section 10 returns to the "Replace Toner (No Reprinting Data)" state 82.

In contrast, when the user selects "Not to Be Deleted" in the deletion check screen, the control section 10 stores into the storage section 15 the FAX image data as reprinting data. After the reprinting data is stored into the storage section 15, the state of the control section 10 transits to the "Replace Toner (Reprinting Data Is Present)" state 84.

In the "Deletion Check" state 72, in a case that the user did not perform selection in the deletion check screen within a fixed time, "Timeout" is determined and then an image quality check screen is displayed. Then, the state returns to the "Image Quality Check" state 72.

Similarly to the "Replace Toner (No Reprinting Data)" state 82, the "Replace Toner (Reprinting Data Is Present)" state 84 is a state that the value of the counter variable n falls within the range greater than or equal to the first number of sheets and smaller than the second number of sheets. However, the latter is different from the "Replace Toner (No Reprinting Data)" state 82 in the point that at least one reprinting data piece is stored in the storage section 15.

When FAX image data is received in the "Replace Toner (Reprinting Data Is Present)" state 84, the state of the control section 10 returns to the "FAX Printing" state 83.

Further, when the toner cartridge is changed to new one in the "Replace Toner (Reprinting Data Is Present)" state 84, the state of the control section 10 transits to the "Ready" state 81 and then transits to the "Reprinting-Data Printing" state 85.

In the "Reprinting-Data Printing" state 85, the printer section 13 prints reprinting data stored in the storage section 15. On completion of the printing of reprinting data, the state of the control section 10 returns to the "Ready" state 81.

<State Transitions in Case that Number of Sheets has Reached First Number of Sheets in the Course of Printing>

In a case that one image data piece is composed of data of a plurality of pages, when the number of printed sheets reaches the first number of sheets in the course of the printing, the state of the degree of consumption of the toner cartridge goes to the "Replace Toner" state in the course of the printing.

Thus, in a case that the number of printed sheets reaches the first number of sheets in the course of printing of image data other than FAX image data in the "Ready" state 81 and then a "Continue" mode is selected, on completion of the printing the control section 10 transits to the "Replace Toner (No Reprinting Data)" state 82.

Here, in a case that the number of printed sheets reaches the first number of sheets in the course of printing of FAX image data and then a "Continue" mode is selected, the state transits to the "FAX Printing" state 83 and then the data of the remaining pages of the FAX image data is printed in the "FAX Printing" state 83. Then, when the user selects "NG" in the image quality check screen or alternatively when the user selects "OK" in the image quality check screen and then selects "Not to Be Deleted" in the deletion check screen, the control section 10 stores the image data including the data of the pages having already been printed in the "Ready" state, as reprinting data into the storage section 15.

In the description given above, the degree of consumption of the toner cartridge in states 81 and 85 corresponds to the "Ready" state. Further, the degree of consumption of the toner cartridge in states 71 and 72 and 82 to 84 corresponds to the "Replace Toner (No Reprinting Data)" state 82 or the "Replace Toner (Reprinting Data Is Present)" state 84. In the following description, these states are generically referred to as the "Replace Toner" state.

<Fax Receiving/Printing Processing>

Figure 3:
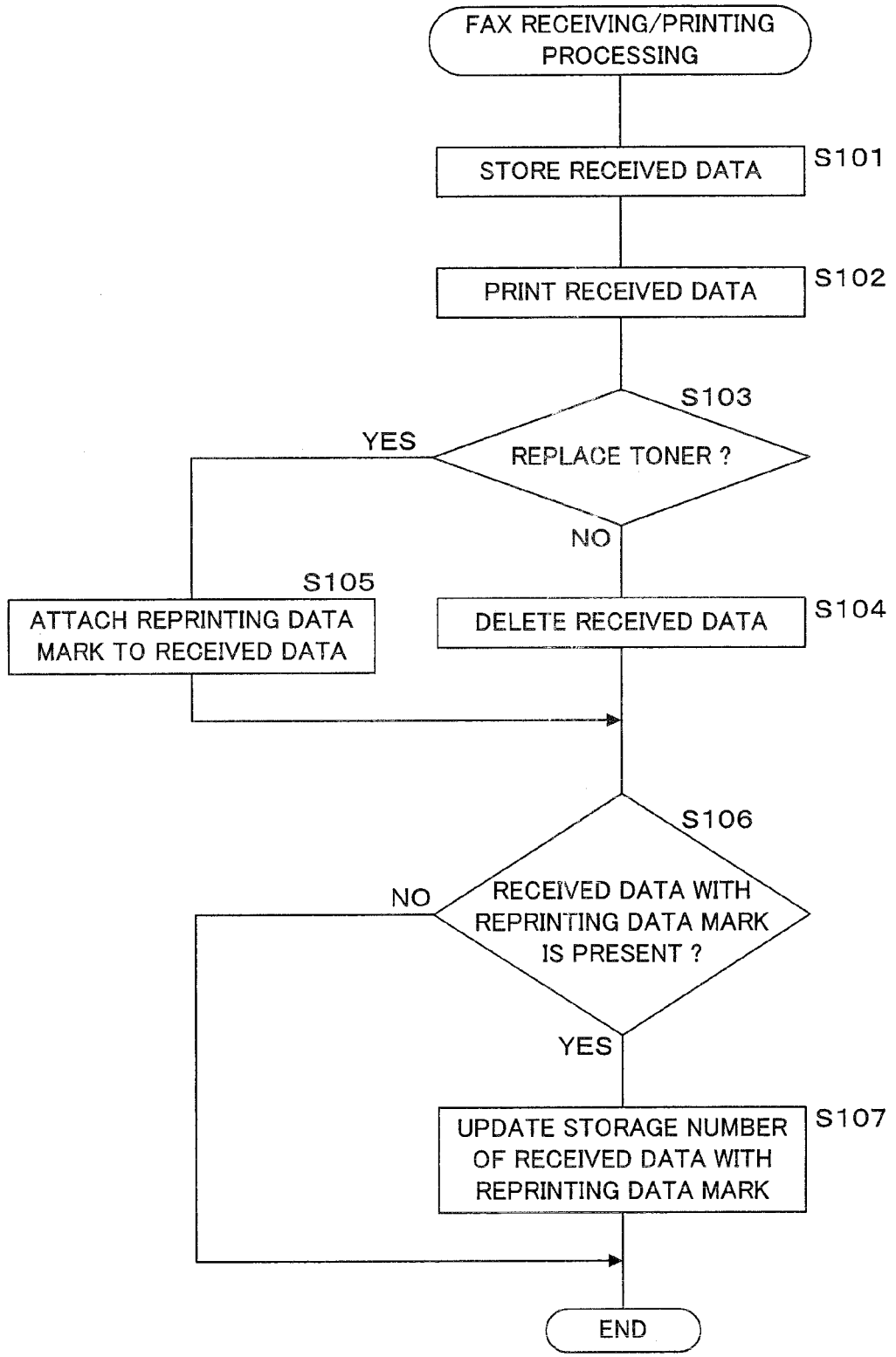
FIG. 3 is a flow chart illustrating a flow of FAX receiving/printing processing.

FIG. 3 is a flow chart illustrating the flow of processing of "FAX Printing" illustrated in FIG. 2. This processing is started when FAX image data is received in the "Ready" state 81 or the "Replace Toner" state.

First, the control section 10 stores into the storage section 15 the FAX image data received by the FAX section 11 (S101). Then, the printer section 13 prints the data (S102). At this time, one FAX image data piece (one job) is printed.

Then, the control section 10 judges whether the toner cartridge is in the "Replace Toner" state (S103), that is, whether the state is any one of the "Replace Toner (No Reprinting Data)" state 82 and the "Replace Toner (Reprinting Data Is Present)" state 84.

When it is judged that the state is not the "Replace Toner" state and is the "Ready" state 81 (S103: No), the control section 10 deletes the printed FAX image data from the storage section 15 (S104).

In contrast, when it is judged that the state is the "Replace Toner" state (S103: Yes), the control section 10 attaches a reprinting data mark to the printed FAX image data stored in the storage section 15 (S105).

Then, the control section 10 judges whether FAX image data with a reprinting data mark is present in the storage section 15 (S106). When it is judged that no FAX image data with a reprinting data mark is present (S106: No), this "FAX Receiving/Printing Processing" is terminated and then reception of new FAX image data is awaited.

In contrast, it is judged that FAX image data with a reprinting data mark is present in the storage section 15 (S106: Yes), the control section 10 updates the storage number of pieces of the stored FAX image data with the reprinting data marks (S107). Specifically, the control section 10 updates a counter variable N expressing the storage number of pieces of the stored FAX image data with the reprinting data marks. Then, this "FAX Receiving/Printing Processing" is terminated and then reception of new FAX image data is awaited.

<Image Quality Check Processing>

Figure 4:
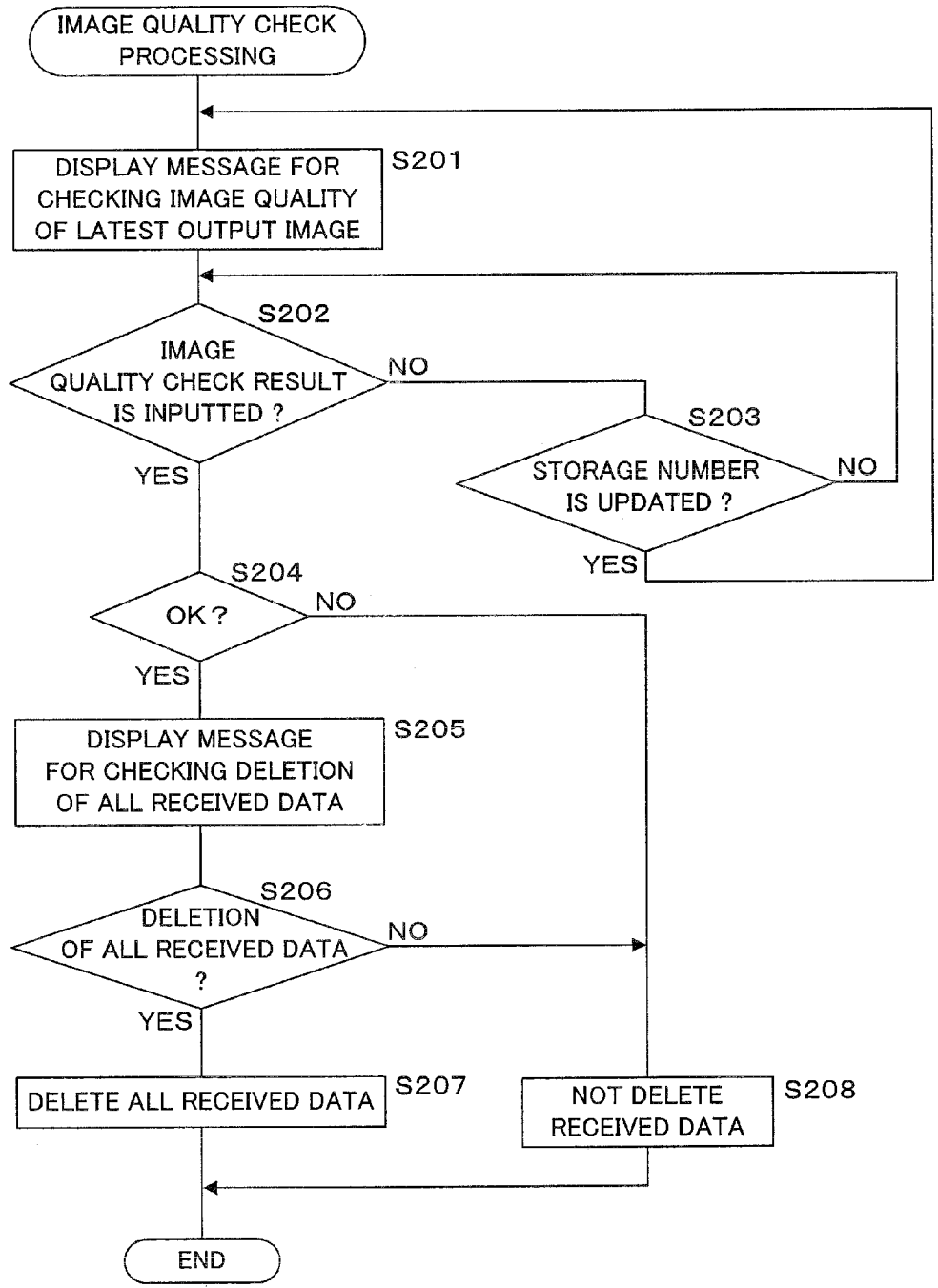
FIG. 4 is a flow chart illustrating a flow of image quality check processing according to Embodiment 1.

FIG. 4 is a flow chart illustrating the flow that the user checks the image quality of the image of the FAX image data printed in the "FAX Printing" illustrated in FIG. 2 (corresponding to the processing in the "Image Quality Check" state 71 and the "Deletion Check" state 72 in FIG. 2). This processing is started when the storage number N of pieces of stored FAX image data with the reprinting data marks is updated at S107 of "FAX Receiving/Printing Processing" in a state that this processing is not yet executed. Then, when the FAX image data with the reprinting data mark has been saved collectively as reprinting data or alternatively deleted collectively, this processing is terminated.

First, the control section 10 displays an image quality check screen (S201). The image quality check screen displays: the storage number N of pieces of the stored FAX image data with the reprinting data marks presently stored in the storage section 15; and a message requesting a check whether the output has been appropriate for the image of FAX image data having been printed most recently by the printer section 13. For example, a message "N items of printed FAX are accumulated in the memory. Is the most recently printed FAX legible?" and choices such as "OK" and "NG" are displayed.

It is seen that the image whose image quality is to be checked through this image quality check screen is the image of the FAX image data printed most recently (the image of the last page of the printed FAX image data of one job). That is, the target image for the image quality check is the image of the FAX image data printed most recently by the printer section 13. The user selects any one of the choices through the touch panel or the operation button of the operation section 14 (inputs an image quality check result).

Then, the control section 10 judges whether the user has selected any choice (has inputted an image quality check result) (S202). That is, the control section 10 judges whether the operation section 14 has received any information concerning the image quality check result. When it is judged that a choice is not yet selected (S202: No), at S107 of "FAX Receiving/Printing Processing" the control section 10 judges whether the storage number N of pieces of the stored FAX image data with the reprinting data marks has been updated (S203).

More specifically, the control section 10 monitors whether the counter variable N has been updated during this processing. Then, when it is judged that the counter variable N has been updated (S203: Yes), the control section 10 updates the image quality check screen (S201). That is, the control section 10 updates the image quality check message already displayed on the image quality check screen.

Specifically, the control section 10 updates the value of the storage number N of pieces of the stored FAX image data with the reprinting data marks, in accordance to the value updated at S107. Then, the updated image quality check screen displays a message requesting the image quality check of the image of the FAX image data newly printed by the printer section 13 (the image of the last page of the printed FAX image data of one job). That is, the target of image quality check according to the present embodiment is always the image of the FAX image data printed most recently.

In contrast, when it is judged that the user has selected a choice displayed on the image quality check screen (an image quality check result is inputted, or alternatively the operation section 14 has received information concerning the image quality check result) (S202: Yes), the control section 10 judges whether "OK" has been selected (S204), that is, whether the FAX image data printed most recently has been printed appropriately. When "OK" is selected, it is judged that the printing has been appropriate (S204: Yes) and then a deletion check screen is displayed on the operation section 14 (S205). For example, a message "Is FAX accumulated in the memory to be deleted?" and choices such as "To Be Deleted" and "Not to Be Deleted" are displayed. Then, the user selects whether all the FAX image data pieces with the reprinting data marks stored in the storage section 15 are to be deleted collectively.

When the user has selected "To Be Deleted" (S206: Yes), the control section 10 collectively deletes all the FAX image data pieces with the reprinting data marks stored in the storage section 15 (S207). Then, the control section 10 resets into 0 the storage number N of pieces of the stored FAX image data with the reprinting data marks (that is, transits to the "Replace Toner (No Reprinting Data)" state 82 in FIG. 2), and then terminates this image quality check processing.

In contrast, when "NG" is selected (S204: No) or alternatively "Not to Be Deleted" is selected (S206: No), the control section 10 judges that all the FAX image data pieces with the reprinting data marks stored in the storage section 15 are not to be deleted, and then holds the data intact in the storage section 15 (S208, that is, transits to the "Replace Toner (Reprinting Data Is Present)" state 84 in FIG. 2). Then, the image quality check processing is terminated.

Further, until the toner cartridge is changed to a new one, the control section 10 holds as reprinting data the FAX image data with the reprinting data mark. Then, after the toner cartridge is changed to a new one, the control section 10 causes the printer section 13 to print the reprinting data, then deletes the data from the storage section 15, and then resets into 0 the storage number N of pieces of the stored FAX image data with the reprinting data marks. Here, the control section 10 does not return into 0 the storage number N of pieces of the stored FAX image data with the reprinting data marks and, when new FAX image data is received in the "FAX receiving/printing processing" in FIG. 3, calculates at S107 the storage number N from the present storage number.

Here, the targets of collective deletion performed at S207 when the user has selected "To Be Deleted" (S206: Yes) are all the FAX image data pieces with the reprinting data marks stored in the storage section 15 including the FAX image data held as reprinting data before the image quality check processing of this turn. Thus, the storage number N of pieces of the stored FAX image data with the reprinting data marks accumulated in association with the image quality check processing performed so far is returned into 0.

According to the present embodiment, when it is judged that the image quality of the image of the FAX image data printed most recently is appropriate, the control section 10 deletes all the FAX image data pieces with the reprinting data marks stored in the storage section 15. By virtue of this, once the user merely inputs an image quality check result of one time, the stored FAX image data is collectively deleted. This reduces operation burden on users.

Further, when it is judged that the image quality of the image of the FAX image data printed most recently is not appropriate, the control section 10 holds intact in the storage section all the FAX image data pieces with the reprinting data marks stored in the storage section. By virtue of this, once the user merely inputs an image quality check result of one time, the stored FAX image data is collective held. This reduces operation burden on users.

Further, the control section 10 causes the user to input an image quality check result concerning the image quality of the image of the most recent FAX image data having been printed before the user inputted the image quality check result. That is, the target of image quality check according to the present embodiment is always the image of the FAX image data printed most recently. This reduces further the number of times necessary input from the user concerning the image quality of a printed image.

(Embodiment 2)

In Embodiment 2 described below, the configuration and the function of the multi function peripheral 1 and the operation of "FAX Receiving/Printing Processing" (FIG. 3) are similar to those described above except for the processing at S107. Thus, their description is omitted.

In Embodiment 2, at S107, the storage number N of pieces of the stored FAX image data is updated and, at the same time, the not-yet-checked number M of pieces of the FAX image data on which image quality check processing is not yet performed among the FAX image data with the reprinting data mark presently stored in the storage section 15 is updated. The not-yet-checked number M of pieces of the FAX image data is initialized into 0 at S308 or S309 described later, and then incremented at each time that one FAX image data piece is printed at S102.

Figure 5:
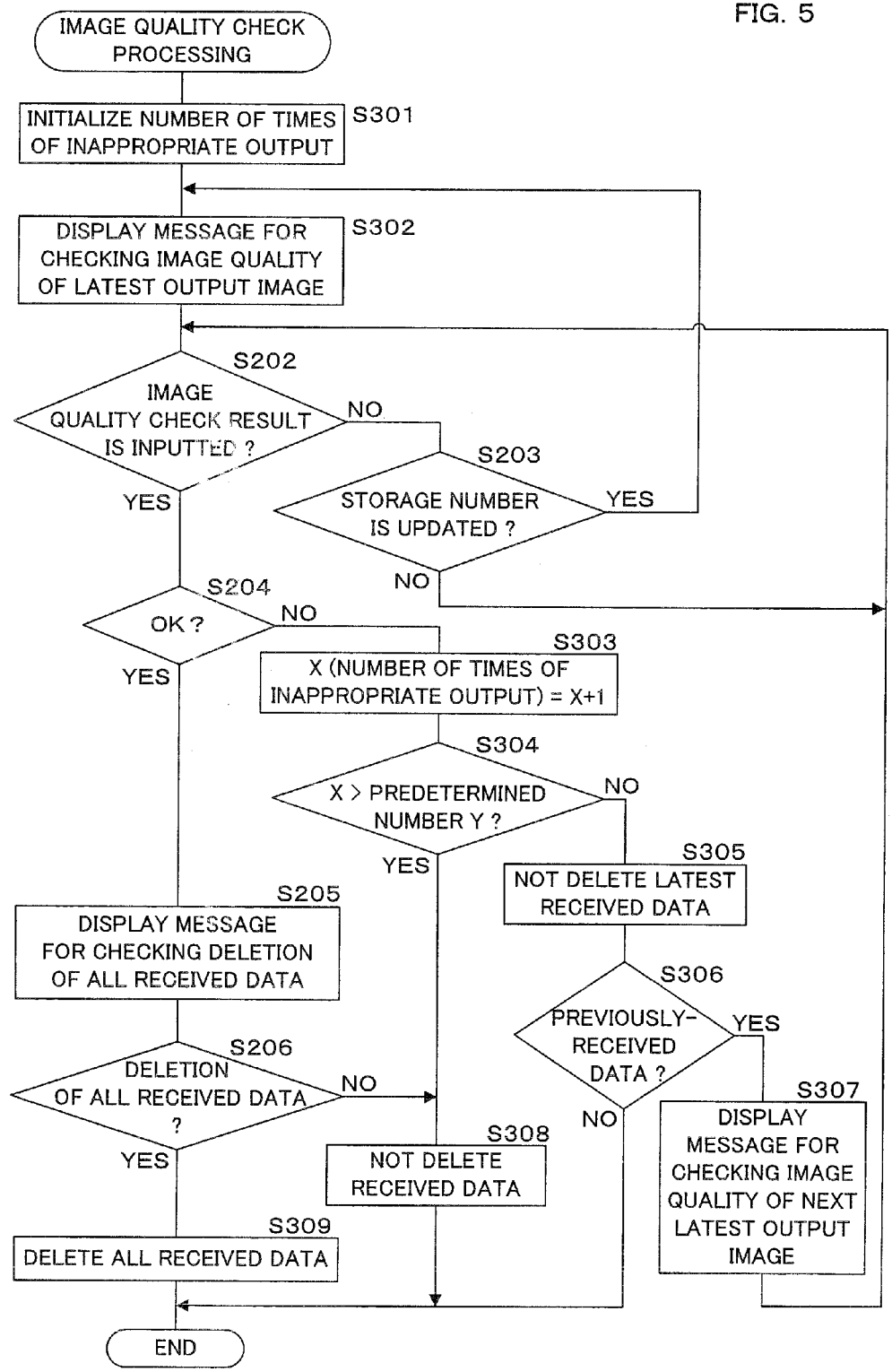
FIG. 5 is a flow chart illustrating a flow of image quality check processing according to Embodiment 2.

FIG. 5 is a flow chart illustrating image quality check processing according to Embodiment 2. This processing is started when the storage number N and the not-yet-checked number M of pieces of the stored FAX image data with the reprinting data marks are updated at S107 of "FAX Receiving/Printing Processing" in a state that this processing is not yet executed. Like steps to those in the "Image Quality Check Processing" (FIG. 4) according to Embodiment 1 are designated by like numerals, and hence their description is omitted.

First, the control section 10 initializes the number X of times of inappropriate output stored in the storage section 15 (S301). The number X of times of inappropriate output indicates the number of times the user inputs "NG" in the image quality check screen of this processing.

Then, the control section 10 calculates the not-yet-checked number M of pieces of the FAX image data on which image quality check processing is not yet performed among the FAX image data with the reprinting data mark presently stored in the storage section 15. Here, the not-yet-checked number M is set equal to the storage number N. Then, the image quality check screen displays: the not-yet-checked number M; and a message requesting a check whether the output has been appropriate for the image of FAX image data having been printed most recently by the printer section 13 (S302). For example, a message "M pieces of printed FAX accumulated in the memory are not yet checked. Is the most recently printed FAX legible?" and choices such as "OK" and "NG" are displayed.

Here, when it is judged that "NG" (inappropriate output) is selected for the image quality of the image of the FAX image data printed most recently (S204: No), the control section 10 (a counting section) increments the number X of times of inappropriate output (S303).

Then, the control section 10 judges whether the number X of times of inappropriate output exceeds a predetermined number Y of times set up in advance (S304). Here, the predetermined number Y of times is stored in advance in the storage section 15. The predetermined number Y of times may be set up by the user, or alternatively may be calculated by multiplying a predetermined factor onto the storage number N of pieces of the stored FAX image data with the reprinting data marks stored in the storage section 15. In the latter case, the control section 10 calculates automatically the predetermined number Y of times when S204 is executed.

When it is judged that the number X of times of inappropriate output exceeds the predetermined number Y of times at S304 (S304: Yes), the control section 10 judges that all the FAX image data pieces with the reprinting data marks stored in the storage section 15 are not to be deleted, and then holds the data intact in the storage section 15 (S308, that is, transits to the "Replace Toner (Reprinting Data Is Present)" state 84 in FIG. 2). Then, the control section 10 initializes into 0 the not-yet-checked number M, and then terminates this image quality check processing.

Further, similarly to Embodiment 1, until the toner cartridge is changed to a new one, the control section 10 holds as reprinting data the FAX image data with the reprinting data mark. Then, after the toner cartridge is changed to a new one, the control section 10 prints the reprinting data, then deletes the data from the storage section 15, and then resets into 0 the storage number N and the not-yet-checked number M of pieces of the stored FAX image data with the reprinting data marks.

In contrast, when it is judged that the number X of times of inappropriate output is smaller than or equal to the predetermined number Y of times (S304: No), the control section 10 judges that the most recent FAX image data is not to be deleted and hence holds the data intact in the storage section 15 (S305, that is, transits to the "Replace Toner (Reprinting Data Is Present)" state 84 in FIG. 2). Then, the control section 10 decrements the not-yet-checked number M of pieces of the FAX image data with the reprinting data marks.

Then, the control section 10 judges the presence or absence of FAX image data received before the most recent FAX image data (the FAX image data judged at S305 not to be deleted) among the FAX image data with the reprinting data mark (S306).

At S306, when it is judged that any FAX image data has been received before the most recent FAX image data (S306: Yes), the control section 10 displays a new image quality check screen (S307). Here, the image quality check screen displays: the not-yet-checked number M of pieces of the FAX image data with the reprinting data marks which has been decremented at S305; and a check message requesting the check of the image quality of the image of the FAX image data printed second most recently. As a result, the image of the FAX image data printed second most recently (that is, the image of the last page of the FAX image data printed one job ago) is adopted as the target of image quality check. Then, the procedure returns to S202. As such, execution of S202, S204, and S303 to S307 is repeated until the number X of times of inappropriate output exceeds the predetermined number Y of times at S303.

In contrast, at S306, when no FAX image data has been received before the most recent FAX image data (S306: No), the control section 10 terminates this image quality check processing.

Further, at S206, when the user has selected "To Be Deleted" (S206: Yes), the FAX image data with the reprinting data mark is deleted collectively (S309). The targets of collective deletion are all the FAX image data pieces with the reprinting data marks stored in the storage section 15 including the FAX image data held as reprinting data before the image quality check processing of this turn. Then, the control section 10 resets into 0 the storage number N and the not-yet-checked number M of pieces of the stored FAX image data with the reprinting data marks accumulated in association with the image quality check processing performed so far (that is, transits to the "Replace Toner (No Reprinting Data)" state 82 in FIG. 2), and then terminates this image quality check processing.

According to the present embodiment, in the control section 10, in a case that plural pieces of FAX image data with reprinting data marks are stored in the storage section 15, even when the image quality of the image of the FAX image data printed most recently is not appropriate (inappropriate output), a possibility is present that the image quality of the image of the FAX image data printed before is appropriate (appropriate output). Then, according to this configuration, the user inputs image quality check results sequentially backward from the image of the FAX image data printed most recently until the number X of times of inappropriate output exceeds the predetermined number Y of times. Then, when the number of times exceeds the predetermined number Y of times, all the FAX image data pieces with the reprinting data marks stored in the storage section 15 are held. Thus, when the image quality is appropriate within the predetermined number Y of times, FAX image data with a reprinting data mark having inappropriate image quality is solely held. That is, FAX image data with a reprinting data mark whose reprinting is necessary is solely held. Further, the number of times of image quality check is controlled to the predetermined number Y of times plus 1 at maximum.

(Embodiment 3)

Figure 6:
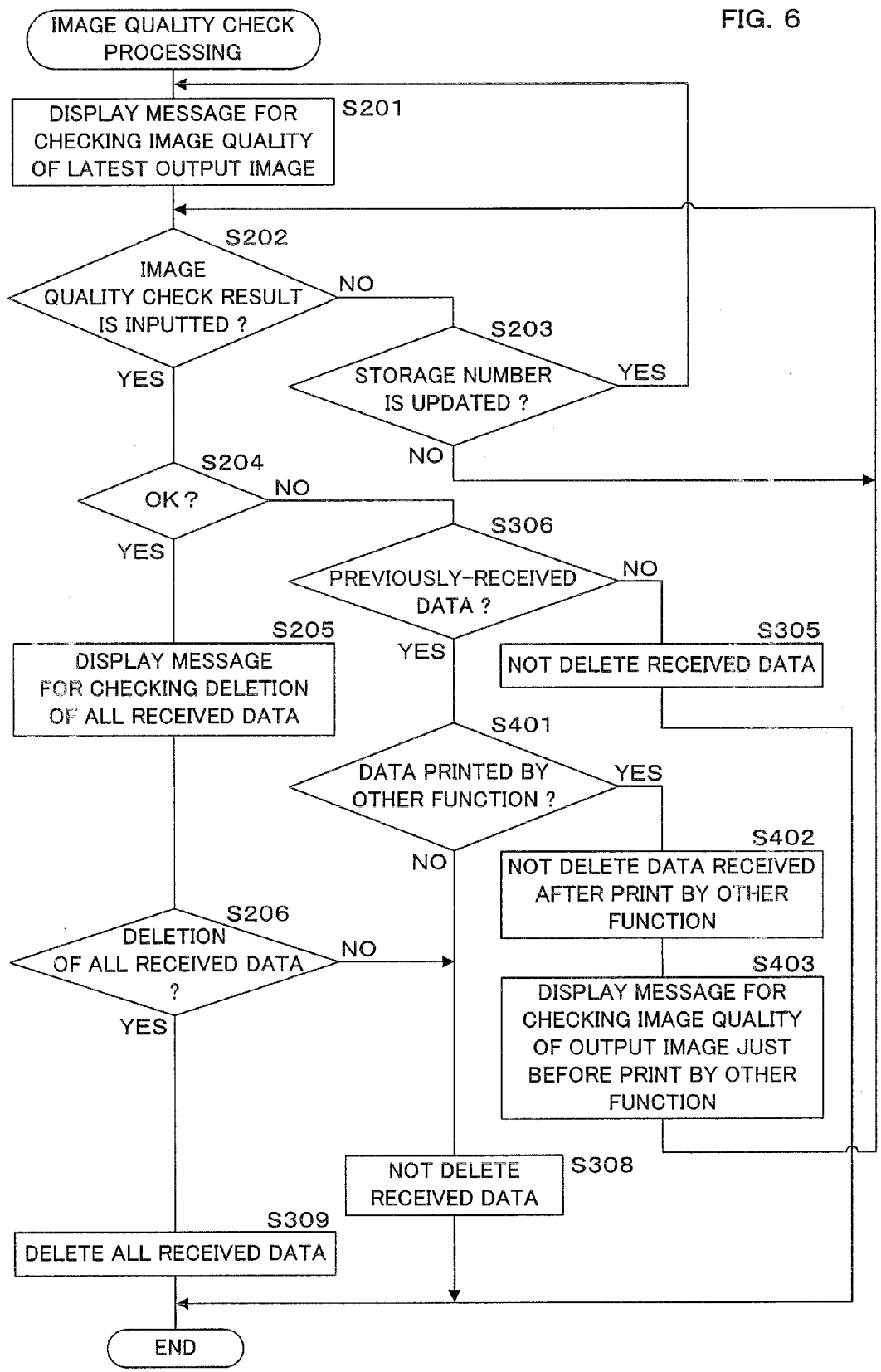
FIG. 6 is a flow chart illustrating a flow of image quality check processing according to Embodiment 3.

FIG. 6 is a flow chart illustrating image quality check processing according to Embodiment 3. In Embodiment 3 described below, the configuration and the function of the multi function peripheral 1 and the operation of "FAX Receiving/Printing Processing" (FIG. 3) are similar to those in Embodiment 2. Thus, their description is omitted.

Further, this processing is started when the storage number N of pieces of the stored FAX image data with the reprinting data marks is updated at S107 of "FAX Receiving/Printing Processing". Like steps to those in the "Image Quality Check Processing" (FIGS. 4 and 5) according to Embodiments 1 and 2 are designated by like numerals, and hence their description is omitted.

At S306, when the control section 10 judges that any FAX image data has been received before the most recent FAX image data (S306: Yes), the control section 10 judges whether any image data among the FAX image data with the reprinting data mark had been printed by a function other than the FAX function before the FAX image data printed most recently was printed (S401). More specifically, the control section 10 stores printing history at each time of printing by the printer section 13. In the printing history, the function (the FAX function, copy function, print function, or direct print function), the printing date and time, and the like are stored for each job. Based on the printing history, the control section 10 judges whether any image data among the FAX image data with the reprinting data mark had been printed by a function other than the FAX function before the FAX image data printed most recently and after the FAX image data printed at the oldest timing.

This is because even in a case that the image quality of the image of the FAX image data printed most recently is judged as "NG" (that is, the image quality is judged as inappropriate), when any other image data has been printed by other function, a possibility is present that the image quality of the image of any FAX image data printed before the above-mentioned image data is appropriate.

At S401, when it is judged that any image data has been printed by other function (S401: Yes), the control section 10 judges that all the FAX image data pieces with the reprinting data marks printed after the above-mentioned image data are not to be deleted, and then holds the data intact in the storage section 15 (S402).

Then, among the FAX image data with the reprinting data mark printed before the image data printed by other function, the image quality is checked again for the image of the FAX image data printed before the FAX image data printed most recently (S403). Then, the procedure returns to the processing at S202. As such, when it is judged as "Yes" at S306, the execution of the processing at S202, S204, S306, and S401 to S403 is repeated until there is no image data printed by a function other than the FAX function before the FAX image data was printed at S401.

At S401, when it is judged that no image data has been printed by other function (S401: No), the control section 10 goes to S308 and then terminates this image quality check processing.

According to the present embodiment, in the control section 10, even in a case that among the plural pieces of FAX image data with the reprinting data marks stored in the storage section 15, the image quality of the image of the FAX image data printed most recently is not appropriate, when any other image data other than FAX image data has been printed before the FAX image data printed most recently, a possibility is present that the image quality of the image of FAX image data printed next is appropriate. Thus, image quality check need be performed on the FAX image data received before the image data other than the FAX image data. By virtue of this, FAX image data with a reprinting data mark whose reprinting is necessary is solely held. This realizes efficient use of the capacity of the storage section 15.

<Other Embodiments>

The present invention is not limited to the embodiments explained with reference to the description given above and the drawings described above. For example, the following embodiments are also contained within the technical scope of the present invention.

The above-mentioned embodiments have been described for an example that the printer section 13 performs printing using toner. Instead, the printer section 13 may print an image onto a recording medium by an inkjet method employing ink accommodated in an ink cartridge provided in a detachable manner.

The above-mentioned embodiments have been described for an example that the printer section 13 performs printing using black toner. Instead, color printing may be performed using toner of four colors of CMYK. In this case, it may be judged as the "Replace Toner" state, for example, when one of the toner cartridges reaches the first number of sheets. Alternatively, the judgment may be performed solely based on the degree of consumption of the toner cartridge accommodating black toner.

The above-mentioned embodiments have been described for a case that the multi function peripheral is employed as an example of a printing apparatus. Instead, a FAX machine having a FAX function alone may be employed.

The FAX section 11 according to the above-mentioned embodiments performs FAX transmission and reception of image data to and from an external FAX machine through a public switched telephone network. However, an option board may be added so that connection to a communication network may be provided. Then, image data may be received from a PC connected to the communication network. Further, such a FAX machine may be employed as a mail client, and then the printing apparatus may have a FAX function of receiving Internet FAX by E-mail.

In Embodiments 1 to 3, when the image of the FAX image data printed most recently in the "Replace Toner" state has been outputted appropriately, all the FAX image data pieces with the reprinting data marks stored in the storage section 15 are deleted. Instead, the FAX image data judged not to be deleted in the last image quality check processing may be excluded from the target of deletion. For example, in the processing at S208 or S308, an image quality check completion mark is attached to FAX image data with a reprinting data mark. Then, when collective deletion is performed at S207 or S309 in the next image quality check processing, it is sufficient that FAX image data with a reprinting data mark but without an image quality check completion mark is solely deleted.

Further, in the processing at S208 or S308, FAX image data with a reprinting data mark may be stored in a region (e.g.: a RAM; a server connected to the multi function peripheral 1, and another storage section in a case that the multi function peripheral 1 has a plurality of storage sections) different from that (the storage section 15) provided for FAX image data whose image quality check processing is not yet performed. Then, when collective deletion is performed at S207 or S309 in the next image quality check processing, it is sufficient that FAX image data with a reprinting data mark stored in the storage section 15 is solely deleted. As a result, FAX image data judged not to be deleted based on the last image quality check result is excluded from a target of deletion, and hence printed reliably.

In Embodiments 1 to 3, received FAX image data (FAX image data not yet printed), printed FAX image data, FAX image data with a reprinting data mark, and FAX image data judged not to be deleted are all stored in the storage section 15. However, at least any one kind of the FAX image data may be stored in a region (e.g.: a RAM; a server connected to the multi function peripheral 1; and another storage section in a case that the multi function peripheral 1 has a plurality of storage sections) different from the storage section 15.

In Embodiments 1 to 3, image quality check processing is performed on FAX image data printed in the "Replace Toner" state. However, the image quality check processing may similarly be performed also on FAX image data printed in the "Ready" state 81.

In Embodiments 1 to 3, when it is judged that the image of the FAX image data printed most recently in the "Replace Toner" state has been outputted inappropriately, image quality check processing (FIGS. 4 to 6) may be not performed on the image of the FAX image data received after the above-mentioned FAX image data (until the cartridge is changed to new one). Then, the data may be judged not to be deleted and then may be held intact in the storage section (may be held as reprinting data). Here, it is sufficient that the image quality check screen displays solely a message "N pieces of FAX are accumulated in the memory". Since the already printed image has been judged as being faint in the last image quality check processing, an image printed after that is expected as being faint similarly. In such a case, the user need not input an image quality check result. Thus, operation burden on users is reduced further.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus processing image data containing FAX image data, comprising:
 a receiving section receiving image data;
 a storage section storing the received image data;
 a printing section printing an image onto a medium, based on the FAX image data stored in the storage section;
 an accepting section accepting information concerning a check result of image quality of the image printed by the printing section;
 a controller, when the accepting section accepts information that the image quality of the image is appropriate, deletes the FAX image data printed by the printing section among the FAX image data stored in the storage section, and when the accepting section accepts information that the image quality of the image is not appropriate, the controller judges that the FAX image data printed by the printing section among the FAX image data stored in the storage section is not to be deleted; and
 a counting section counting the number of times the accepting section accepts the information that the image quality of the image is not appropriate,
 wherein the controller judges whether the number of times counted by the counting section is smaller than or equal to a predetermined number of times, the controller judges whether plural pieces of FAX image data printed by the printing section are stored in the storage section, when it is judged that the number of times is smaller than or equal to the predetermined number of times, the controller judges that the FAX image data printed most recently by the printing section among the FAX image data stored in the storage section is not to be deleted, when the controller judges that the number of times is smaller than or equal to the predetermined number of times and that plural pieces of FAX image data printed by the printing section are stored in the storage section, the accepting section accepts information concerning a check result of image quality of an image of the FAX image data printed second most recently, and when it is judged that the number of times exceeds the predetermined number of times, the controller judges that the FAX image data printed by the printing section among the FAX image data stored in the storage section is not to be deleted.

2. The image processing apparatus according to claim 1, wherein at each time that the printing section prints an image based on FAX image data, the control section updates acceptance information used for accepting information concerning a check result of image quality of the image.

3. The image processing apparatus according to claim 1, wherein the controller judges that the FAX image data which is printed after judgment that the FAX image data is not to be deleted, is not to be deleted.

4. An image processing apparatus, processing image data containing FAX image data, comprising:
a receiving section receiving image data;
a storage section storing the received image data;
a printing section printing an image onto a medium, based on the FAX image data stored in the storage section;
an accepting section accepting information concerning a check result of image quality of the image printed by the printing section; and
a controller, when the accepting section accepts information that the image quality of the image is appropriate, deletes the FAX image data printed by the printing section among the FAX image data stored in the storage section, and when the accepting section accepts information that the image quality of the image is not appropriate, the controller judges that the FAX image data printed by the printing section among the FAX image data stored in the storage section is not to be deleted,
wherein the controller judges whether plural pieces of FAX image data printed by the printing section are stored in the storage section,
when the accepting section accepts the information that the image quality of the image is not appropriate and the controller judges that plural pieces of FAX image data are stored in the storage section, the controller judges whether before the printing of the most recent FAX image data printed by the printing section, an image of image data other than the FAX image data has been printed,
when it is judged that an image of image data other than the FAX image data has been printed, the controller judges that the FAX image data printed after the image data is not to be deleted and then the accepting section accepts information concerning a check result of image quality of an image of the FAX image data printed immediately before the image of the image data, and when it is judged that an image of image data other than the FAX image data has not been printed, the controller judges that the FAX image data printed by the printing section among the FAX image data stored in the storage section is not to be deleted.

5. The image processing apparatus according to claim 1, wherein the controller does not delete the FAX image data judged not to be deleted.

6. An image processing apparatus processing image data containing FAX image data, comprising:
receiving means for receiving image data;
storage means for storing the received image data;
printing means for printing an image onto a medium, based on the FAX image data stored in the storage means;
accepting means for accepting information concerning a check result of image quality of the image printed by the printing means;
controlling means for, when the accepting means accepts information that the image quality of the image is appropriate, deleting the FAX image data printed by the printing means among the FAX image data stored in the storage means, and when the accepting means accepts information that the image quality of the image is not appropriate, the controlling means judges that the FAX image data printed by the printing means among the FAX image data stored in the storage means is not to be deleted; and
counting means for counting the number of times the accepting means accepts the information that the image quality of the image is not appropriate,
wherein the controlling means judges whether the number of times counted by the counting means is smaller than or equal to a predetermined number of times,
the controlling means judges whether plural pieces of FAX image data printed by the printing means are stored in the storage means,
when it is judged that the number of times is smaller than or equal to the predetermined number of times, the controlling means judges that the FAX image data printed most recently by the printing means among the FAX image data stored in the storage means is not to be deleted,
when the controlling means judges that the number of times is smaller than or equal to the predetermined number of times and that plural pieces of FAX image data printed by the printing means are stored in the storage means, the accepting means accepts information concerning a check result of image quality of an image of the FAX image data printed second most recently, and
when it is judged that the number of times exceeds the predetermined number of times, the controlling means judges that the FAX image data printed by the printing means among the FAX image data stored in the storage means is not to be deleted.

7. The image processing apparatus according to claim 6, wherein at each time that the printing means prints an image based on FAX image data, the controlling means updates acceptance information used for accepting information concerning a check result of image quality of the image.

8. The image processing apparatus according to claim 6, wherein the controlling means judges that the FAX image data which is printed after judgment that the FAX image data is not to be deleted, is not to be deleted.

9. An image processing apparatus, processing image data containing FAX image data, comprising:
receiving means for receiving image data;
storage means for storing the received image data;

printing means for printing an image onto a medium, based on the FAX image data stored in the storage means;

accepting means for accepting information concerning a check result of image quality of the image printed by the printing means; and controlling means for, when the accepting means accepts information that the image quality of the image is appropriate, deleting the FAX image data printed by the printing means among the FAX image data stored in the storage means, and when the accepting means accepts information that the image quality of the image is not appropriate, the controlling means judges that the FAX image data printed by the printing means among the FAX image data stored in the storage means is not to be deleted, wherein the controlling means judges whether plural pieces of FAX image data printed by the printing means are stored in the storage means, when the accepting means accepts information that the image quality of the image is not appropriate and the controlling means judges that plural pieces of FAX image data are stored in the storage means, the controlling means judges whether before the printing of the most recent FAX image data printed by the printing means, an image of image data other than the FAX image data has been printed, when it is judged that an image of image data other than the FAX image data has been printed, the controlling means judges that the FAX image data printed after the image data is not to be deleted and then the accepting means accepts information concerning a check result of image quality of an image of the FAX image data printed immediately before the image of the image data, and when it is judged that an image of image data other than the FAX image data has not been printed, the controlling means judges that the FAX image data printed by the printing means among the FAX image data stored in the storage means is not to be deleted.

10. The image processing apparatus according to claim 6, wherein the controlling means does not delete the FAX image data judged not to be deleted.

\* \* \* \* \*